Fig. 1

INVENTORS
Edward C. Bopf &
Fred A. Thomann
Attorneys

INVENTORS
Edward C. Bopf &
Fred A. Thomann
BY
Attorneys

March 16, 1954 E. C. BOPF ET AL 2,672,001
MULTIROW COTTON HARVESTER
Filed Sept. 10, 1951 5 Sheets-Sheet 3

INVENTORS
Edward C. Bopf &
Fred A. Thomann
BY
Attorneys

March 16, 1954  E. C. BOPF ET AL  2,672,001
MULTIROW COTTON HARVESTER
Filed Sept. 10, 1951  5 Sheets-Sheet 4

Fig. 5

INVENTORS
Edward C. Bopf &
Fred A. Thoman
BY
Attorneys

March 16, 1954     E. C. BOPF ET AL     2,672,001
MULTIROW COTTON HARVESTER Filed Sept. 10, 1951     5 Sheets-Sheet 5

INVENTORS
Edward C. Bopf &
Fred A. Thomann
BY
Attorneys

Patented Mar. 16, 1954

2,672,001

UNITED STATES PATENT OFFICE 2,672,001

MULTIROW COTTON HARVESTER

Edward C. Bopf and Fred A. Thomann, Des Moines, Iowa, assignors to Deere Manufacturing Co., Dubuque, Iowa, a corporation of Iowa Application September 10, 1951, Serial No. 245,792

34 Claims. (Cl. 56—14)

This invention relates to a multi-row harvester and more particularly to such harvester as embodied in what is known as a self-propelled harvester.

It is known, of course, to provide harvesters of the general class referred to. However, although many such machines have been patented, experience has shown that only a few lend themselves to commercially acceptable design standards. It seems likely that the one-row machine would be the basis for a similar machine containing as many harvesting units as are necessary to harvest crops from the number of rows desired. Yet, although it is a relatively simple matter to design a one-row machine, it does not necessarily follow that a two-row harvester, for example, entails merely twice the design effort required in the case of a one-row machine. A consideration of the various problems involved will support this proposition. Initially, compactness of design is one of the prime essentials, and it is obvious that harvesting units cannot be multiplied indefinitely without increasing the over-all size of the machine to monstrous proportions. Merely to double a one-row machine often necessitates the exercise of extreme ingenuity in coordinating the locations and functions of the two row units. Part of this problem arises because of the general desire and practical necessity for utilizing in a two-row, self-propelled machine certain vehicle characteristics based on familiar agricultural tractor designs. Furthermore, the conventional spacing between the rows in which crops are planted must be given more than passing consideration, for the transverse spacing between rows in certain crops is often such as to render the design of a two-row machine commercially impracticable.

The last-mentioned proposition has heretofore militated against the design and acceptance of a two-row harvester for picking cotton. Each of the row units involves picking mechanism of a relatively highly complicated nature. This mechanism occupies considerable space and because of its somewhat delicate structure must be appropriately housed and requires more than the usual amount of power to operate the various parts satisfactorily. In the interests of compact and suitable design, it is desirable that the two row units be arranged in transverse alinement or in closely spaced side-by-side relationship. Yet, the very nature and size of the picking mechanisms have heretofore prevented this association of the two row units and have required the longitudinal offsetting of the units so that the picking mechanism of one unit could overlap a central zone without conflict with the picking mechanism of the other unit.

According to the present invention, this conflict is resolved and the picking mechanisms are located side by side so as to lend themselves to support on a vehicle having what may be considered conventional agricultural vehicle design characteristics. It is commonly accepted that the cotton-picking mechanism superior to others is that of the rotating-spindle type in which a rotatable drum structure carries a plurality of circumferentially spaced upright picker bars and each picker bar is provided with a plurality of vertically spaced, radially projecting rotating spindles, which may or may not be barbed. The drum is rotated and the picker bars are controlled by a cam track to impart to the picker bars a definite movement through a peculiarly shaped orbit instrumental in enabling the spindles to pick cotton at maximum capacity and at the same time permitting the spindles to depart from the cotton plants and into doffing mechanisms that operate to remove picked cotton from the spindles. The general principles involved in cotton-picking mechanism of this type are, of course, not new, but it is only recently that the principles have undergone refinement to the extent that the mechanism lends itself to embodiment in commercially acceptable machines. Nevertheless, as stated above, the nature of the mechanism has prevented extensive production of other than one-row machines or two-row-machines in which the picking mechanisms are offset from front to rear. On the basis of what has been said above, it can be seen that the principal obstacle to the design of a compactly organized multi-row unit is the possible interference of the radially projecting spindles of one picking mechanism with those of a companion picking mechanism.

It is a further important object of the present invention to locate the picking mechanisms in side-by-side relationship and to stagger the vertical spacing of the spindles in one unit relative to those in the other unit so that the spindles of the units may pass freely and without conflict through a non-picking zone centrally between a pair of adjacent rows being picked. Another important object of the invention in this respect is to utilize the interspacing of the spindles because of the vertically staggered relationship mentioned to accommodate transverse adjustment of one picking unit relative to the other so that the picking units may be adapted to accommodate variations in row spacing. Although conventional row spacing may not vary more than a few inches, nevertheless the slight variation is sufficient to prevent the use of a multi-row machine in one field if it has been specifically designed for use in a field in which the row spacing is different.

The invention contemplates and has for a further object the provision of a pair of row units disposed in side-by-side relationship and having longitudinal, upright inner side portions closely spaced apart at opposite sides of the longitudinal centerline between the two adjacent rows on which the row units respectively operate. The picking elements of one unit will project through the open inner sides and across the zone defined by said open inner sides and centered on the centerline between said two adjacent rows. It is an object of the invention to utilize these open sides for accommodating the vertically staggered relationship of the picking elements referred to above. A related object concerns the utilization of trash guard means forming a barrier across the bottom of this central zone so as to prevent the entrance of trash into the picking elements as they pass through the central zone on their way back to the respective picking zone. In connection with the transverse adjustability of the row units, it is an object of the invention to provide the trash guard means in such manner that the units may be adjusted without disturbing the operational efficiency of the guard means.

Other objects of the invention include improved mounting of the row units on the supporting structure, such as a vehicle; the arrangement in the supporting or mounting means of provision for adjustment of the units toward and away from each other to vary the spacing between plant passages provided in the units for operating simultaneously on the plants in the two adjacent rows; improved supporting means including a central support common to both units and a pair of individual outer supports individually connected respectively to the two units; auxiliary supporting means connected to lower portions of the row units and utilizing the principles that accommodate adjustment of the units toward and away from each other; and, generally, the provision of improvements that may be found applicable in harvesters of other types.

The foregoing and other important objects and desirable features inherent in and encompassed by the invention are achieved in one preferred form of the invention as described in detail in the following specification and illustrated in the accompanying sheets of drawings in which.

Figure 1:
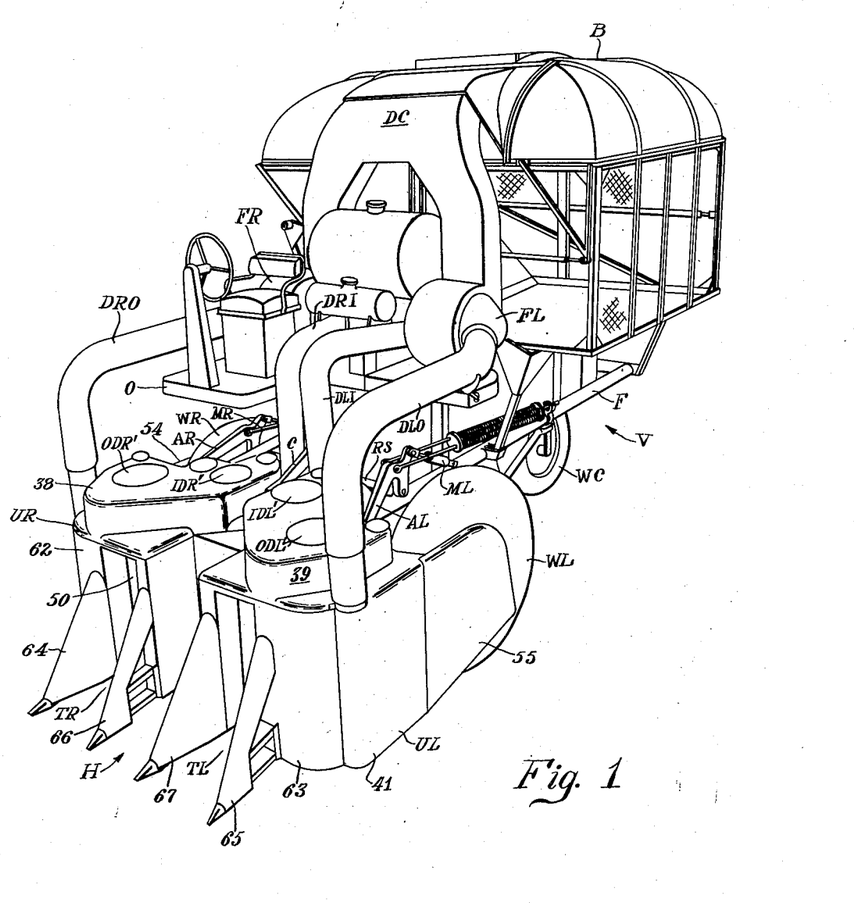
Figure 1 is a perspective view from the left-hand front side of the cotton harvester.

Figure 1 best shows the general organization of the machine and reference will therefore be had to this figure for a brief and general description of what is involved.

The machine comprises a vehicle V made up of longitudinal main frame F that is carried at its front end on a pair of relatively large, transversely spaced right- and left-hand traction wheels WR and WL and at its rear on a single wheel WC located rearwardly of and on the centerline between the wheels WR and WL. Any other suitable arrangement could, of course, be provided as equivalents of the ground-engaging means represented by the three wheels just described.

The wheels WR and WL are spaced apart transversely a distance such that they span a pair of adjacent parallel rows. Stated otherwise, each wheel runs outside one row of said pair of rows. The wheel WC runs between said pair of rows.

Connected to the vehicle for travel therewith is a harvester, designated generally by the letter H, here including cotton-picking mechanism comprising right- and left-hand row units UR and UL. Each of these units carries picking mechanism, the details of which will be described below, operative to pick crops (here cotton) planted in the two adjacent rows spanned by the wheels WR and WL. The units UR and UL respectively have longitudinal plant passages or throat means TR and TL for accepting or receiving the plants in the respective rows.

It will be observed that the row units UR and UL are transversely alined and closely spaced in side-by-side relationship. These units are supported on the vehicle frame F by means of supporting structure including a transverse rockshaft RS on which are fixed first, second and third supports comprising right- and left-hand outer supporting arms AR and AL and a central arm C. These arms are connected to the row units UR and UL in a manner to be described in detail below. Vertical adjustment of the row units relative to the ground is achieved by rocking of the rockshaft RS through means of right- and left-hand power-transmitting mechanisms designated here generally at MR and ML. These mechanisms may be of any conventional type, such as shown in the U. S. patent to Paul, 2,630,870 and need no further elaboration here.

The vehicle is controlled and guided by an operator from an operator's station O carried substantially directly above the right-hand unit UR. The details of the operator's station are not important here.

The vehicle frame F carries thereon rearwardly of the row units a receptacle in the form of a basket B to which cotton picked by the picking mechanism in the row units is delivered by a pneumatic conveying system comprising right- and left-hand blower fan housings FR and FL and a plurality of ducts. The right-hand blower housing FR is connected by outer and inner ducts DRO and DRI to the row unit UR and the left-hand housing FL is connected by outer and inner ducts DLO and DLI to the left-hand row unit UL. The blower housings are connected by a common central duct DC to deliver into the basket B.

The foregoing will cover the general organization of the harvesting machine. The following will pertain successively to the various details that combine to successfully complete the machine.

Figure 2:
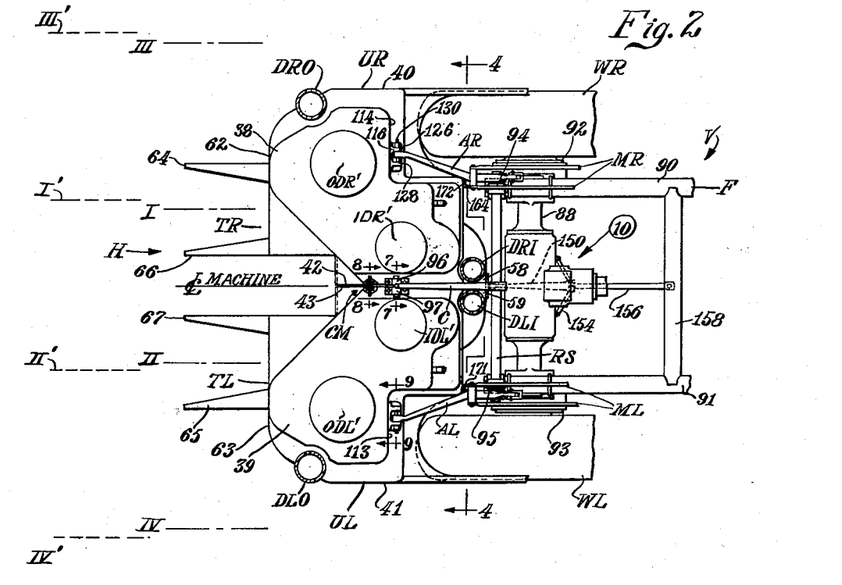
Figure 2 is a plan view, partly in section and with parts of the superstructure removed, of the forward portion of the cotton harvester shown in Figure 1.
Figure 5:
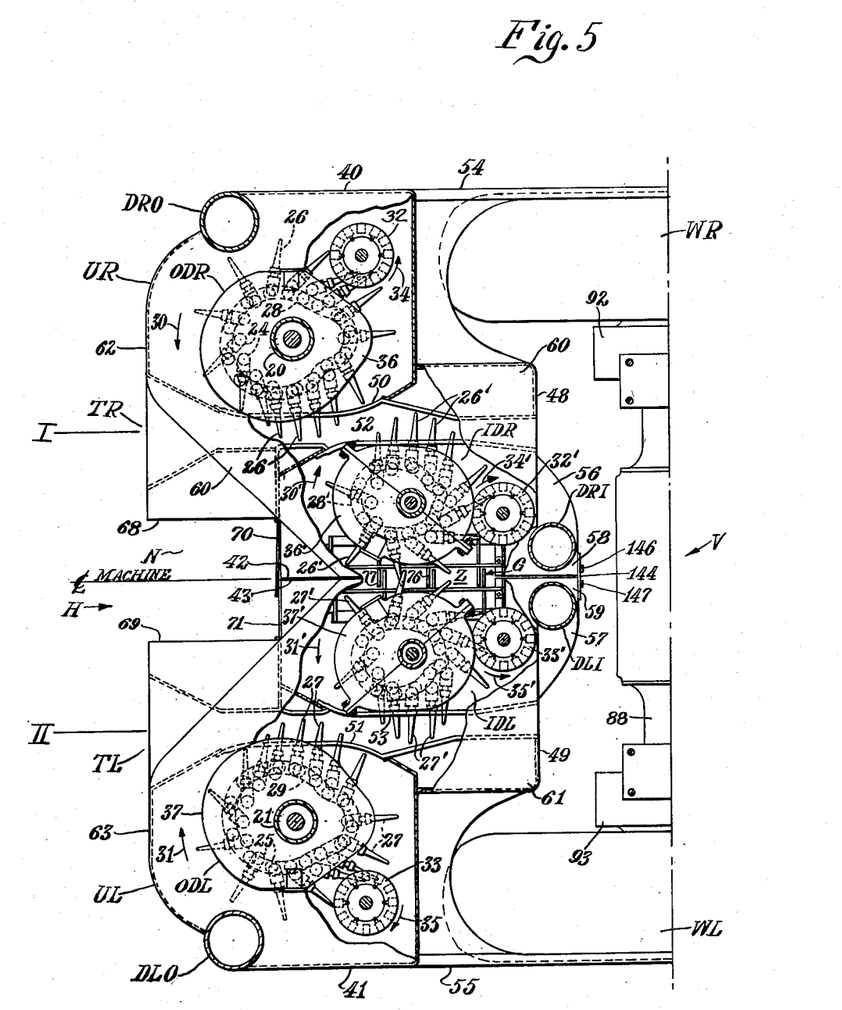
Figure 5 is an enlarged fragmentary sectional view taken substantially on the line 5—5 of Figure 3 and with exterior portions broken away for better illustration of interior portions.

The relationship of the row units UR and UL to the rows being operated on and to other rows is best illustrated in Figures 2 and 5. The two adjacent rows from which the plants are respectively received in the passage or throat means TR and TL of the respective units UR and UL are designated at I and II. An adjacent row outside or to the right of row I is indicated at III and a fourth row outside or to the left of row II is indicated at IV. The uniform spacing between the rows I, II, III, and IV is here shown as being based on a conventional minimum and the units UR and UL are adjusted transversely relative to each other so that the passage or throat means TR and TL are centered respectively on the rows I and II. There are indicated in dotted lines and designated by the numerals I', II', III', and IV' other rows spaced apart uniformly according to the conventional maximum. For present purposes, the rows I' through IV' may be ignored.

Figure 6:
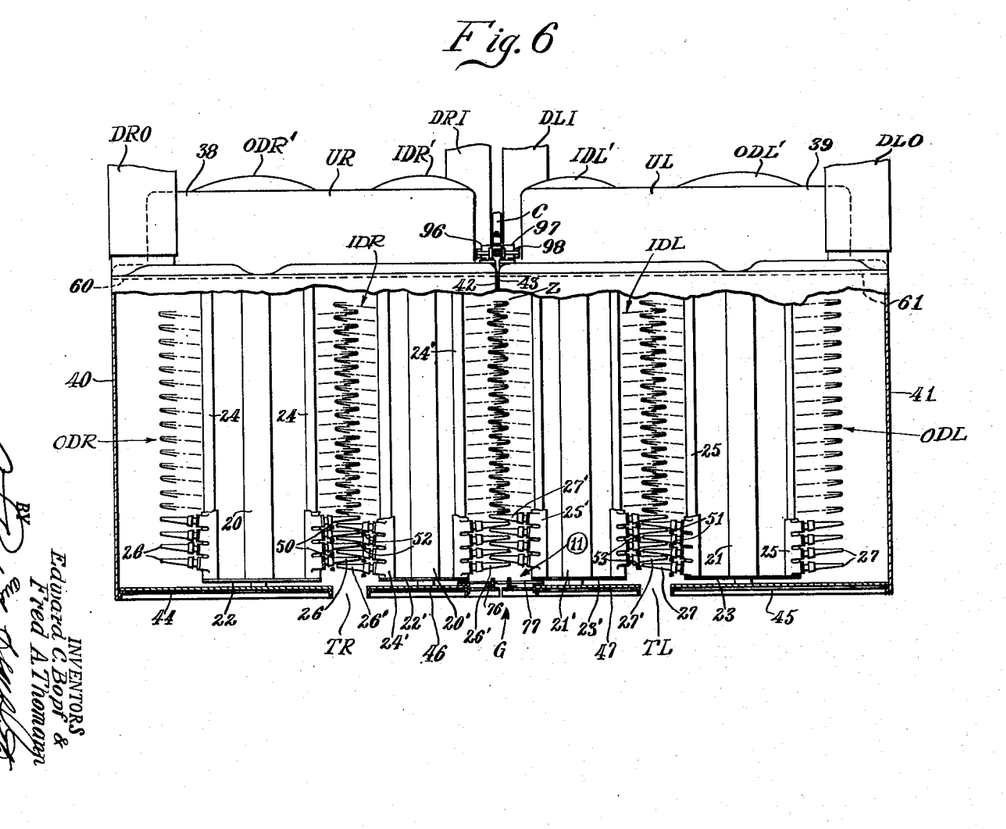
Figure 6 is a fragmentary sectional view, on the scale of Figure 5, as seen along the line 6—6 of Figure 3.

As best shown in Figures 5 and 6, the right-hand row unit UR carries or contains harvesting or picking means comprising an outer drum ODR and an inner drum IDR. The left-hand row unit UL is symmetrical as respects the right-hand unit and contains or carries harvesting means or picking mechanism including an outer drum ODL and an inner drum IDL. Each of these drum structures may be of the general character disclosed, for example, in U. S. Patent 2,140,631. Although the drum structures disclosed here are not identical to that in the patent, the reference to the patent will serve to clarify general details omitted here because they are not important to the present disclosure. Aside from the fact that the present disclosure is based on a two-row machine, whereas the patented disclosure pertains merely to a single-row machine, another distinction resides here in the arrangement by means of which each of the inner drums is of smaller diameter than its companion outer drum. The latter distinction need not be presently considered.

In Figures 1–4 and 6, the respective locations of the four drums are designated by application of the legends ODR', IDR', IDL' and ODL' to the approximate centers of the respective housing portions above the drums. This, plus the disclosure in Figure 5, will serve to orient the drum structures relative to the rows I and II.

The right-hand outer drum comprises an upright rotatable support 20 having at its lower end a circular carrier 22 (Figure 6). A similar carrier (not shown) is positioned adjacent the top of the support 20 and there is carried between these carriers a plurality of uniformly circumferentially spaced upright picker bars 24. In the present case, there are sixteen such bars 24. Each bar is mounted at its opposite ends for angular movement about its principal axis relative to the upper and lower carriers. Thus, the picker bars may oscillate relative to the carriers and relative to each other.

Each picker bar 24 carries a plurality of uniformly vertically spaced picking elements, here shown as rotating spindles or fingers 26. These spindles project generally radially outwardly as respects the axis of the drums. Because of the facility of oscillation of the picker bars 24, the spindles do not at all times lie exactly on radii of the drum axis. Nevertheless, the expression is deemed satisfactory for present purposes. The upper ends of the picker bars are conventionally connected by suitable means (not shown) to be guided or controlled by a cam track 28, as in U. S. Patent 2,140,631 that serves to define the orbit or closed path through which the picker bars move during the cotton-picking operation.

The drum structure ODR rotates in the direction of the arrow 30 (Figure 5) and the spindles 26 are caused to successively enter the plant passage or throat means TR from the outside thereof. Thus, the spindles 26 pick from the outside of plants in the row I. The spindles then move conventionally inwardly to a circular doffing means 32 that rotates in the direction of the arrow 34 to doff cotton from the cotton-laden spindles and to throw this cotton forwardly to be picked up by suction in the conduit DRO.

The cam track 28 is provided in an upper cam plate 36 that is fixed to housing structure of the row unit UR, which housing structure will be subsequently described.

The inner drum IDR is constructed similarly to the outer drum ODR, with two exceptions: First, the diameter of the inner drum IDR is somewhat less than that of the outer drum ODR and there are therefore fewer picker bars; second, as will be pointed out below, the vertical spacing of the spindles on the inner drum picker bars is vertically staggered relative to the vertical spacing of the spindles 26. Since the two drum structures are otherwise similar, the detailed description of the outer drum ODR will serve as a basis for the description of the inner drum IDR. As to the latter, the same reference characters bearing a prime suffix will be applied.

The inner drum IDR is offset longitudinally (here rearwardly) from the outer drum ODR. The spindles 26' travel in the direction of the arrow 30' and, since the drum IDR is located at the inner side of the row I, the spindles 26' pick from the inner sides of plants in that row. The spindles 26' are withdrawn from the plant passage TR and are engaged by a rotating doffer means 32', which rotates in the direction of the arrow 34' to doff the cotton from the cotton-laden spindles 26' and to throw this cotton rearwardly and inwardly to be picked up by suction in the conduit DRI.

The outer drum ODL has the same general structural characteristics as the outer drum ODR, except that it is symmetrical rather than identical. Since the details of the two outer drums structures are sufficiently alike as to preclude any misunderstanding, a detailed description of the left-hand outer drum ODL will not be indulged. Odd numerals respectively following the even numerals used in the description of the outer drum ODR will be applied to the components of the outer drum on the left-hand side. It should be observed at this point that there is one important difference, aside from symmetry rather than identity, between the outer drums ODR and ODL. This distinction is that the vertical spacing of the fingers or spindles 27 in the outer drum ODL is staggered relative to the vertical spacing of the spindles 26 in the outer drum ODR. The purpose of this distinction will be brought out later.

The arrangement between the inner and outer drums at both sides of the longitudinal centerline of the machine (which, incidentally, is coincident with the longitudinal centerline between the rows I and II) is again one of symmetry rather than identity. That is to say, the outer drums ODR and ODL are transversely alined but are relatively widely spaced apart to operate respectively from the outer sides of the rows I and II. The inner drums IDR and IDL are transversely alined on a line rearwardly offset from the transverse line on which the outer drums lie, the inner drums picking respectively from the inner sides of plants in the rows I and II. Since the inner drums IDR and IDL are symmetrical, and since the components thereof are substantially identical, with one exception to be pointed out below, and since all the drums are generally of the same character, the reference numerals applied to the parts of the inner drum IDL will be the same, plus a prime suffix, as those applied to the parts of the outer drum ODL.

Figure 4:
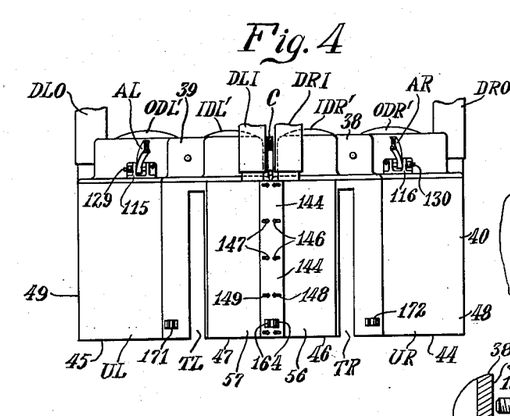
Figure 4 is a fragmentary transverse sectional view taken substantially along the line 4—4 of Figure 2.

The right-hand row unit UR comprises supporting means for the right-hand picking mechanism that is made up of the outer and inner drums ODR and IDR. To that end, the unit comprises structure in the form of a substantial enclosure including an upper housing having a top portion 38 having a transverse extent substantially equal to the distance between the centerline of the machine and the plane of the outer face of the right-hand wheel WR. This can best be seen in Figure 2. The row unit thus has an outer side portion in the form of an upright wall 40 lying just to the right of the plane of the outer face of the wheel WR and an upright inner portion or side 42 lying closely alongside and just to the right of the longitudinal centerline of the machine. As stated above, the centerline of the machine in this particular case is likewise the centerline between the rows I and II. The side portions 40 and 42 depend from the upper housing 38 and adjoin a transverse horizontal bottom or lower portion 44—46, the sections 44 and 46 of the bottom portion being spaced apart to define lower portions of the longitudinal throat or passage means TR (Figure 6). The rear portion of the right-hand row unit UR is closed by an upright transverse wall 48 except for an upright elongated opening therein coincident with the right-hand throat or passage means TR (Figure 4). The upper housing 38 contains conventional mechanism, as in U. S. Patent 2,140,631, for driving the drum structures ODR and IDR and the bottom portion 44—46 serves as means for journaling the lower ends of the upright drum supports 20 and 20'.

The throat means TR is defined at one side by a plurality of longitudinally extending, vertically spaced grid bars 50 through which the spindles 26 project as they move rearwardly in the passage. The opposite side of the passage is defined by a similar plurality of bars 52 through which the spindles 26' of the inner drum IDR project during the picking operation. The structure just described is not material to the present disclosure but is mentioned merely for the purposes of completing the general organization of the interior of the right-hand row unit UR. This row unit is further supplemented at its outer or right-hand side by a rearwardly extending wheel shield 54 substantially coplanar with the right-hand side portion 40 and lying just outside the right-hand wheel WR. The rear wall or back portion of the row unit UR includes as part of the wall 48 an upright transversely curved closure 56 through which the cotton passes from the doffing means 32' to the duct DRI. The back portion 48—56 further includes a rear upright mounting portion 58, the purpose of which will appear later.

Figure 3:
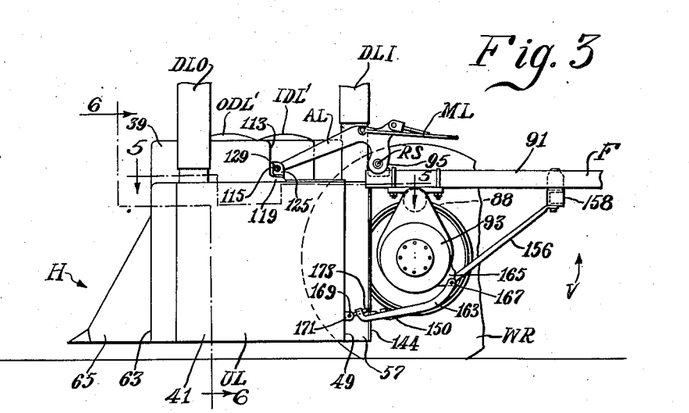
Figure 3 is a side elevational view of that portion of the harvester shown in Figure 2, the left-hand front wheel having been omitted from the view to expose structure behind that wheel.

Since Figure 5 is a section on the line 5—5 of Figure 3, the upper housing 38 does not appear in the view. Other portions of the structure are broken away to expose interior portions of the mechanism. Actually, the upper housing 38 rests on a transverse horizontal plate 60, shown in dotted lines in Figure 6. Portions of the plate 60 appear in Figure 5. Again, this detail is unimportant but is mentioned briefly in the interests of clarity. This plate does not appear in Figure 1, for example, because marginal portions of the housing 38 are formed so as to conceal the plate.

The left-hand row unit UL is constructed in a manner symmetrically as respects the unit UR. Thus, the unit UL has an upper or top housing 39, outer and upright inner portions or sides 41 and 43, a bottom portion comprising sections 45 and 47, and a rear portion 49—57—59. Grid bars 51 and 53 define the passage TL just as the grid bars 50 and 52 define the right-hand passage TR. The left-hand unit includes a transverse horizontal plate structure 61.

The right-hand unit UR has an upright transverse front portion 62 open in alinement with the passage TR and provided with a pair of forwardly extending plant guides 64 and 66. Similar structure is provided at 63—65—67 for the left-hand unit UL. The left-hand unit includes a shield 55 coplanar with its outer side portion 41 and lying just outside or to the left of the left-hand wheel WL.

The row units UR and UL are supported on the vehicle by means of the supporting arms C, AR and AL for travel with the machine to operate simultaneously on plants in the rows I and II. The drums ODR and IDR are offset from front to rear and the spindles 26 and 26' respectively thereof operate at opposite sides of plants passing through or received by the passage TR. Thus, the spindles 26 and 26', while traveling through their respective orbits, operate at times in a picking zone coincident with the passage TR. The spindles 27 and 27' likewise operate at times in a picking zone coincident with the left-hand passage TL.

As will perhaps be best observed in Figures 5 and 6, the upright inner side portions 42 and 43 of the right- and left-hand units UR and UL respectively lie in side-by-side relationship and are narrowly spaced apart at opposite sides of the centerline between the rows I and II. Since, as is seen in Figure 5, the two inner drum structures IDR and IDL are in transverse alinement, the spindles 26' and 27' thereof at times project simultaneously across this centerline and move longitudinally from rear to front in what may be termed a non-picking zone Z defined by said upright inner side portions 42 and 43. This zone is longitudinally and uprightly disposed and is centered on the centerline between the rows I and II. Of course, the zone is not defined in its entirety by the relatively closely spaced side portions 42 and 43 as illustrated in Figure 5, but it must be borne in mind that the side portions of the row units UR and UL, represented generally by the numerals 42 and 43, are open, so that in effect the zone is defined, at least in part, by the upright picker bars 24' and 25' (Figure 6) as these picker bars move from rear to front in their orbits. Since there are spindles 26' and 27' passing at all times through the same central space or zone Z, it would be expected that these spindles would conflict in this zone. However, this conflict is eliminated according to the present invention by staggering the vertical spacing of the spindles 26' on their picker bars 24' relative to the vertical spacing of the spindles 27' on their picker bars 25'. Thus, as will be observed in Figure 6, the spindles may loosely interfit or pass between each other as they move from rear to front in their non-picking phase. In view of the interfit or intermingling of the spindles in the zone Z, the two units UR and UL can be brought more closely together to accommodate the relatively narrow spacing of the rows I and II. Since the row units UR and UL are transversely adjustable relative to each other, the units may be adjusted to accommodate wider row spacing, as those indicated at I', II', III', and IV' in Figure 2. Thus, the spindles loosely interfit not only longitudinally but also transversely so that as the row units are moved or adjusted back and forth toward each other, the spindles may move transversely relative to each other without conflict.

It will be further seen in Figure 6 that the spindles 26' of the inner drum on the right-hand side are vertically staggered relative to the spindles 26 of the outer drum ODR. A staggered relationship also exists between the spindles 27' and 27 of the inner and outer drums IDL and ODL. The vertically staggered relationship between the spindles of the respective inner and outer drums need not be provided as means to avoid conflict between the spindles 26 and 26', for example, for these spindles operate in longitudinally offset zones. The same is true as respects the spindles 27 and 27'. However, the vertical staggering or offsetting becomes important from the standpoint of production, since the picker bars 24 can then be made identical to the picker bars 25'. Likewise, the picker bars 24' and 25 may be identical. Stated otherwise, the horizontal plane through which any series or layer of spindles 26 operates is the same as that through which a corresponding series or layer of spindles 27' operates. This horizontal plane is offset relative to a selected horizontal plane through which spindles 26' and 27 operate.

Figure 11:
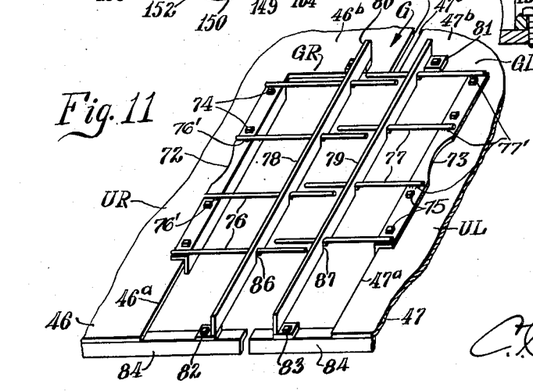
Figure 11 is an enlarged fragmentary prospective view as seen generally in the direction of the arrow bearing the encircled numeral 11 in Figure 6 and illustrating the trash guard means at the bottom of the space between the two row units.

In the assembled and operationally related arrangement of the units UR and UL, the forward portions 62 and 63 respectively thereof terminate in laterally spaced relation to define what may be termed a central notch N delineated at opposite sides by wall portions 68 and 69 and closed at its rear by overlapping transverse wall portions 70 and 71. This part of the structure may be considered a peculiarity of the present design and is not material as far as concerns the present invention. The overlapping relationship of the transverse wall portions 70 and 71 is such that these wall portions may slide one upon the other as the row units are adjusted toward or away from each other. These wall portions serve another function, in that they enclose the front end of the central space or zone Z. As will be brought out hereinafter, the central space or zone Z is closed at its back and is substantially closed at its top because of the proximity of the marginal inner edges of the housings 38 and 39 that lie respectively along the inner side portions 42 and 43. Thus, the central space or zone Z is open largely only at its sides and bottom, which is best indicated in Figures 6 and 11. The open bottom combined with the open inner side portions 42 and 43 provides adequate air inlets for the pneumatic conveying system. At the same time, however, it is desired to prevent the entrance to the pneumatic conveying system of trash in the form of branches, weeds, etc. For this reason, the open bottom of the zone Z is provided with trash guard means, designated generally by the letter G and comprising means forming a barrier across the bottom.

The trash guard means comprises a right-hand element GR and a left-hand element GL secured respectively to the right- and left-hand bottom portions 46 and 47. The right-hand bottom portion 46 includes a longitudinal marginal edge 46a that is relatively widely spaced with respect to a corresponding marginal edge 47a on the left-hand bottom section 47. These two marginal edges extend longitudinally in parallelism throughout substantially the entire length of the central space or zone Z, at which point the bottom sections 46 and 47 are offset respectively at 46b and 47b to provide more closely spaced parallel marginal edge portions 46c and 47c. The trash guard elements GR and GL occupy only that space between the more widely spaced marginal edge portions 46a and 47a.

The right-hand element GR comprises a first longitudinal member 72 provided with a plurality of securing means, such as cap screws 74, for mounting on the bottom section 46 along the marginal edge 46a. A plurality of guard members or fingers 76 project inwardly from the member 72 across the centerline between the units UR and UL. The fingers 76 are rigid on the member 72, which rigidity is preferably accomplished by welding at 76'. A second longitudinal member 78 extends parallel to the member 72 and is connected at its rear end at 80 to the offset bottom portion 46b and is connected at 82 at its forward end to a transverse member 84 that extends laterally inwardly from the bottom section 46. The member 78 lies intermediate the secured and free ends of the fingers 76 and is provided with a plurality of spaced slots 86 that respectively engage the fingers 76. The member 78 serves to impart longitudinal rigidity to the fingers 76.

The other guard element GL is made up of substantially the same components, which will be designated by odd numerals respectively following the numerals used to describe the right-hand element GR; viz., longitudinal member 73, secured by cap screws 75 to the marginal edge 47a of the bottom section 47, and having fingers 77 welded thereto at 77'. The two elements GR and GL may be said to differ to the extent that the fingers 76 and 77 are interspaced across the centerline between the units UR and UL. Although the fingers lie in substantially the same horizontal plane, which is substantially the horizontal plane of the coplanar bottom sections 46 and 47, the interspacing of the fingers accommodates transverse adjustment of the units UR and UL relative to each other. At the same time, the two elements combined provide suitable grid means across the bottom position of the central space or zone Z.

It will also be noted that the plane in which the grid elements GR and GL lie is at a level below the zone through which the spindles 26' and 27' pass in their non-picking phase. Therefore, the trash means serves to eliminate the possibility of the entrance of trash to the spindles before the spindles return to their picking phases. The trash means functions also to deflect or press down any weeds that may be growing between the rows I and II. Also, the guard means is of sufficient strength to level out clods or uneven ground portions between the rows I and II, thus eliminating the possibility of the entrance of dirt to either the picking mechanisms or the pneumatic conveying system.

The vehicle V includes transverse means, here in the form of a transverse axle housing 88 to which are secured frame members 90 and 91 of the vehicle frame F. The transverse means 88 is in the form of an axle housing because of the design of the vehicle wherein the wheels WR and WL are traction wheels. Driving mechanism of any suitable type may be included in the vehicle, part of which will be contained, as is generally conventional in agricultural tractors (e. g., see U. S. Patent 2,601,553), in the transverse axle housing 88 and in a pair of depending housing portions 92 and 93 that include stub axles (not shown) on which the wheels WR and WL are respectively mounted. The depending housing portions 92 and 93 provide supports for the picking mechanisms, in a manner that will be set forth below.

The frame members 90 and 91 extend ahead of the transverse axle means 88 and respectively carry bearings 94 and 95 for journaling the transverse rockshaft RS. As previously stated, the supports or arms C and AR and AL are fixed in transversely spaced relation on the rockshaft RS and extend forwardly over the tops of the row units UR and UL. The center arm C extends longitudinally over and above the central space or zone Z between the units; and the arms AR and AL extend to top parts respectively of the units UR and UL substantially immediately behind the outer drums ODR and ODL. The three arms are connected to the units by mounting means alined on a transverse axis, the details of which will be described immediately below.

Figure 7:
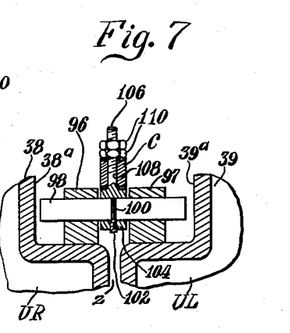
Figure 7 is an enlarged fragmentary view taken on the line 7—7 of Figure 2 and showing the central support that is common to both row units.

The connection of the central support or arm C to the units UR and UL is best shown in Figures 2 and 7. Stated briefly, this connection is common to the two units so that both units at their inner or proximate portions are connected to the single arm C.

The inner portions of the housings 38 and 39 respectively include upright wall portions 38a and 39a spaced relatively widely apart to provide a longitudinal central pocket or recess between the inner portions of the housings. It is in this pocket or recess that the mounting means for connecting the central arm C to the picking units is located. This mounting means comprises a pair of mounting elements in the form of apertured ears 96 and 97 rigidly secured respectively to the housings 38 and 39 and through which passes a transverse connecting member or pin 98. The free end of the central arm C is apertured so as to receive the connecting pin. The pin is grooved intermediate its ends, as at 100, and the end of the central arm C carries a set screw or equivalent locking device 102 to prevent transverse displacement of the connecting pin 98.

The forward end of the central arm C includes a leveling device for adjusting the units UR and UL relative to each other to aline them in a horizontal plane relative to the connections between the units and the arms AR and AL. A representative form of leveling device is shown as comprising an eye member 104 apertured to receive the pin 98 and including centrally therewith an upstanding threaded portion 106. The portion 106 passes loosely through a vertical aperture 108 in the front end of the arm C and receives a pair of lock nuts 110 by means of which the arm C may be adjusted vertically relative to the eye member 104 and consequently relative to the inner portions of the units UR and UL.

The connections between the units UR and UL and the arms AR and AL are substantially identical. However, since the left-hand connection is shown in detail and in section in Figure 9, this connection will be described first and the various components thereof will be designated by odd numerals in accord with the general system utilized in describing the parts of the machine at the left-hand side of the centerline thereof. The left-hand upper housing or casting 39 includes a transverse upright rear wall 113 to which is removably secured a mounting element 115, cap screws 117 being utilized for this purpose. The casting or housing 39 further includes a horizontal flange portion 119 to which is secured by cap screws 121 a lower flange portion 123 of the mounting member 115. Upstanding from the flange 123 are two apertured ears 125 and 127, the former being threaded and the latter being unthreaded. A transverse connecting and adjusting member 129 is received by the apertured ears 125 and 127 and also by the apertured free end of the arm AL. The member 129 is threaded at one end portion thereof, as at 131, and is unthreaded at that portion thereof that passes through the arm AL and the apertured ear 127. The extreme end of the threaded portion 131 is provided with a wrench-receiving portion 133 by means of which the member 129 may be rotated to effect transverse adjustment of the unit UL relative to the arm AL. The arm AL is constrained against axial movement relative to the member 129 by locking means including a groove and snap ring assembly 135.

Figure 9:
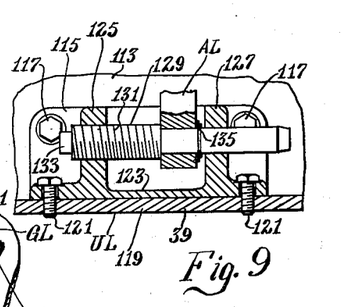
Figure 9 is an enlarged transverse sectional view taken on the line 9—9 of Figure 2 and illustrating one of the outer means for accomplishing adjustment of the outer unit relative to its support.

Since the right-hand connection is not illustrated in as complete detail as the left-hand connection, a complete correspondence of reference numerals cannot be secured. However, since the two connections are identical, except reversed, the following brief description is deemed to be sufficient. The rear outer portion of the right-hand casting or housing 38 includes an upright rear wall 114 to which is secured a mounting element 116. This element has apertured ears 126 and 128 corresponding respectively to the ears 125 and 127 of the left-hand connection. A combined adjusting and connecting member 130 is utilized to complete the connection. In other details, the right- and left-hand connections are the same.

Figure 8:
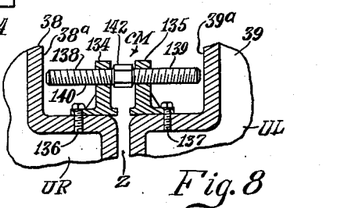
Figure 8 is an enlarged sectional view taken on the line 8—8 and showing the means for accomplishing transverse adjustment between the units.

The central adjusting means is designated generally by the legend CM and is best illustrated in Figures 2 and 8. In view of the small scale of Figure 2, the single designation CM will be used in that figure and reference will be had to Figure 8 for the details of the structure. As shown in the latter figure, the adjusting means CM is located in the pocket or recess defined by the wall portions 38a and 39a of the housings or castings 38 and 39. The means comprises a pair of mounting elements in the form of apertured ears 134 and 135 secured respectively as at 136 and 137 to horizontal ledge portions of the castings 38 and 39. The ears 134 and 135 are oppositely threaded and receive oppositely threaded ends 138 and 139 of a transverse rotatable adjusting element 140, which element is provided intermediate its ends with wrench-receiving means in the form of a hexagonal portion 142. The member 140, like the central connecting pin 98, bridges the central space or zone Z between the units UR and UL. It will be seen that by means of the application of a wrench to the portion 142, the member 140 may be rotated in either direction to cause movement of one unit relative to the other. Thus, in combination with the adjustments provided at 115 and 116, transverse adjustment of one unit relative to the other is relatively easily accomplished.

The supporting or connecting means just described comprises supports for carrying the picking mechanisms from their upper portions. Stated otherwise, the picking mechanisms are suspended from the vehicle by means of the upper supports comprising the central arm C and the outer arms AR and AL. In addition, means is provided for connecting lower portions of the units UR and UL to the vehicle.

Figure 10:
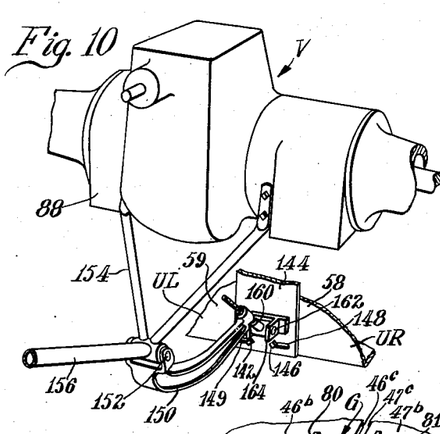
Figure 10 is an enlarged fragmentary perspective view as seen in the direction of the arrow bearing the encircled numeral 10 in Figure 2 and showing part of the lower central support for the row units.

As previously described, the units UR and UL include at their rear portions mounting elements or pads 58 and 59, these lying respectively at opposite sides of the back portion of the central zone Z. As also previously stated, the central zone Z is substantially closed at its front, top and back, being open only at its bottom via the guard means G. The closure for the back end of the central space or zone Z comprises a mounting element in the form of an elongated upright plate 144, best shown in Figures 4 and 10, bridging the rear portion of the central space or zone Z and being secured to the mounting pad portions 58 and 59 in such manner as to accommodate transverse adjustment of the units UR and UL. In the present case, the securing means comprises a plurality of vertically spaced cap screws 146 and 147 passed respectively through slots 148 and 149 in the upright plate 144 and respectively into the mounting pad portions 58 and 59. The slots run horizontally as shown in Figures 4 and 10 and, when the cap screws 146 and 147 are loosened, accommodate movement of the unit UR relative to the unit UL. The cap screws can, of course, be tightened after the desired adjustment is secured. In addition to closing the rear of the central space or zone, the plate 144 imparts considerable rigidity to the units and further serves as means for connecting lower portions of the units in common to a central auxiliary lower support.

As best shown in Figure 10, the central lower support comprises link means 150 having its rear end pivoted on a transverse axis at 152 to a central depending support 154 which in turn includes a central rearwardly extending brace 156. The rear end of the brace 156 is secured to a transverse member 158 cross connecting the frame members 90 and 91 of the vehicle frame F rearwardly of the transverse axle 88. The central depending support 154 is substantially transversely alined with the depending supports provided by the depending axle housing portions 92 and 93. For this reason, the exercise of caution must be indulged in the orientation of parts in Figure 3, since the central structure is in part overlapped by left-hand structure to be subsequently described.

The forward end of the link means 150 is connected by means of a leveling device 160 which is in turn pivoted by a pin 162 on a transverse axis to a connection including a pair of transversely alined apertured ears 164 rigid with a lower portion of the upright mounting plate 144. The leveling device 160 may be considered to have the same general detailed construction as that previously described in connection with the upper central support as shown in Figure 7. Therefore, these details need not be repeated.

The lower central connection just described absorbs longitudinal thrust imposed on the units UR and UL. At the same time, the pivotal connections at 152 and 162 articulately mount the units at their central portions and permit the units to be vertically adjusted as a result of rocking of the rockshaft RS.

The left-hand outer portion of the unit UL is connected at its bottom by an auxiliary support or link means 163 to the depending support afforded by the depending axle housing portion 93. This axle housing portion has rigid thereon an apertured ear 165 that provides means for the pivotal connection by a pin 167 on a transverse axis to the rear portion of the link means 163. The forward end of the link means 163 is pivotally connected on a transverse axis 169 to a pair of apertured ears 171 secured to a lower part of the rear wall portion 49 of the left-hand unit UL, just to the left of the left-hand throat or passage means TL (Figure 4). The connection 169 may also include a leveling device 173, which device may be similar to that illustrated in Figure 7, thus eliminating the necessity for further detailed description here.

The right-hand unit UR is similarly braced or connected to the depending support afforded by the right-hand depending axle portion 92 by another auxiliary support or link means that may be identical to the link means 163. Only a forward portion of the right-hand link means is visible at 164 in Figure 2, as is the connecting means comprising a pair of apertured ears 172 corresponding to the connection 171 on the unit UL. The mounting connection 172 is also visible in Figure 4.

The assumed row spacing for the rows I, II, III, and IV in the drawings is 36 inches. This is a conventionally narrow row spacing; although, several fields are planted in rows of this spacing. Since the present machine is adapted to accommodate plants in fields of this character, the machine has a versatility far in excess of those previously known. At the same time, the machine may be adapted to conventionally wider rows. In this respect, the dotted row positions indicated at I', II', III', and IV' in Figure 1 represent a row spacing of 40 inches.

Because of the overlapping or intermingling spindles, the extreme narrow spacing required may be easily accomplished. The row units are, as previously described, relatively easily adjustable toward or away from each other to accommodate row spacing between a minimum position and a maximum position. Normally it will be expected that the spindles will occur simultaneously in the central space or zone Z only when the row units are adjusted to their positions of minimum spacing; although, there will be several ranges between the minimum position and the maximum position in which some overlapping and intermingling will occur. Nevertheless, because of the vertically staggered spacing between the series or layers of spindles, there is no mechanical conflict in this zone. Since this zone is a non-picking zone, the spindles may pass freely between each other as they move from rear to front on their way around their orbits toward their respective picking zones in the plant passages or throats TR and TL. Likewise, the guard fingers 76 and 77 of the trash guard means G are sufficiently long to overlap throughout the range of adjustment between minimum and maximum positions. The overlapping door means 70 and 71 maintains the closure of the central space or zone Z throughout adjustment, as does the rear plate 144 relative to the rear end portion of the zone. The fact that the upper portion of the zone opens when the units UR and UL are adjusted to their maximum positions is immaterial, since normally no trash will be found above the units, whereas considerable trash may be experienced in front of, behind, and below the units.

These are but a few of the features of the invention. Others have been previously pointed out in the general statement of the objects of the invention and others have been enumerated in the foregoing description. Still other features will occur to those versed in the art, as likewise will numerous modifications and alterations in the preferred structure disclosed, all of which may be achieved without departing from the spirit and scope of the invention as defined in the appended claims.

What is claimed is:

1. A mobile cotton harvester adapted to travel over a cotton field for harvesting cotton simultaneously from plants in two adjacent rows, comprising: a vehicle having a pair of supporting wheels spaced apart transversely to straddle said two rows, and a supporting frame carried by said wheels in a position centered over said two rows and at a level adjacent the tops of plants in said rows; a pair of separate cotton-harvesting units transversely alined and arranged to operate simultaneously on plants in said two rows, each unit having a top portion substantially at the level of the frame and a lower portion depending from said top portion into proximity to the ground, said units being separated along the centerline between said two rows and respectively having upright inner portions spaced closely apart at opposite sides of said centerline to leave a space between said units to accommodate transverse adjustment of the units relative to each other; mounting means on the vehicle for carrying the units in selected positions of variable row spacing, including first and second transversely spaced supports connected to the frame and extending respectively to transversely spaced parts of the top portions of the units, and a third support connected to the vehicle and extending to a position over the aforesaid space between the units; a pair of individual means connecting the first and second supports respectively to said parts of the top portions of the units, each of said means including relatively transversely movable elements providing for transverse adjustment of each unit relative to its support; third individual means common to the units in proximity to the third support and connected to said units and to said third support, said third means having relatively transversely movable elements for accommodating adjustment of said units transversely toward or away from each other and relative to said third support; a pair of auxiliary supports spaced apart transversely and connected between the frame and transversely spaced parts of lower portions of said units; a third auxiliary support intermediate said first and second auxiliary supports and connected to the frame and having a common connection to proximate lower parts of the lower portions of said units; and each of said auxiliary supports including provision to accommodate relative transverse adjustment of said units.

2. The invention defined in claim 1, further characterized in that: each of said units is provided at the bottom of its lower portion with a trash guard extending at least part way across said space between the units, said trash guards respectively having overlapping portions loosely interfitting to accommodate transverse adjustment of the units.

3. The invention defined in claim 1, further characterized in that: the connection of the third auxiliary support to the units comprises an upright mounting member spanning and substantially closing the back of the space between the units and adjustably secured to the units for movement transversely relative to both units.

4. A mobile cotton harvester for harvesting cotton simultaneously from plants in two adjacent rows in a cotton field, comprising: a vehicle for travelling over the field along said rows; a pair of transversely alined independent picking mechanisms spaced apart transversely to pick cotton simultaneously from plants in said two adjacent rows, each picking mechanism including a plurality of generally horizontal picker fingers operative both inside and outside the respective row of said two adjacent rows so as to pick from both sides of plants in said respective row; certain of said fingers in each mechanism being arranged in vertically spaced horizontal layers and movable in horizontal orbits such that said certain fingers at times intersect a longitudinal upright plane centrally between said two adjacent rows; and said layers of fingers in one mechanism being vertically staggered relative to the layers of fingers in the other of said mechanisms so that said certain fingers of both mechanisms can simultaneously intersect said central plane without conflict with each other.

5. A mobile cotton harvester adapted to travel over a cotton field for harvesting cotton simultaneously from plants in two adjacent rows, comprising: a vehicle having a pair of supporting wheels spaced apart transversely to straddle said two rows, and a supporting frame carried by said wheels in a position centered over said two rows and at a level adjacent the tops of plants in said rows; a pair of separate cotton-harvesting units transversely alined and arranged to operate simultaneously on plants in said two rows, each unit comprising an upright housing having a top and bottom, inner and outer sides and a back portion adjoining said inner side, said housings being disposed with their inner sides proximate and closely spaced apart at opposite sides of the centerline between said two rows to provide a space between the housings, and with their back portions transversely alined, the top of each unit having an outer mounting part and an inner mounting part, said outer parts being transversely alined and spaced relatively widely apart, and said inner parts being transversely alined and spaced closely apart respectively adjacent the inner sides of the housings; mounting means on the vehicle for carrying the housings in selected positions of variable row spacing, including first and second transversely spaced supports connected to the frame and extending respectively to the outer mounting parts, and a third support connected to the vehicle and extending to said inner mounting parts; first and second connecting means connecting the first and second supports individually and respectively to the outer mounting parts; a third connecting means commonly connecting said inner mounting parts to the third support; each of said first, second and third supports having provision for transverse adjustment of the housings relative to each other to vary the row spacing between said housings; first and second auxiliary supports connected between the vehicle and lower portions of the housings; a third auxiliary support connected to the vehicle and having a common connection to said transversely alined back portions of the housings; and each of said auxiliary supports including provision to accommodate transverse adjustment of the housings.

6. The invention defined in claim 5, further characterized in that: the back portion of each housing is upright and runs between the top and bottom of its housing, said back portions are alined in a transverse upright plane; and the common connection between the third auxiliary support and the back portions comprises an upright member adjustably secured to said back portions and spanning and closing the back of said space between the housings, and said member has a mounting part at a lower portion thereof affording said connection to said third auxiliary support.

7. A mobile cotton harvester adapted to travel over a cotton field for harvesting cotton simultaneously from plants in a plurality of rows, comprising a mobile supporting vehicle for advance over the field lengthwise of the rows; a plurality of individual cotton-harvesting units transversely alined and arranged to operate simultaneously on plants in a plurality of rows, each unit having a top and a bottom and an inner upright side, a pair of adjacent units being arranged to operate on two adjacent rows and having their inner sides proximate and closely spaced apart at opposite sides of the centerline between such two adjacent rows to provide an open space between the housings along said centerline; upper and lower separate means interconnecting said pair of adjacent units respectively across upper and lower portions of said open space and providing for adjustment of said housings transversely relative to each other; upper and lower separate supports connected to the vehicle and connected respectively to said upper and lower means to support said pair of adjacent housings on the vehicle; a plurality of additional supports connected to the vehicle and extending to transversely spaced portions of the tops of the housings on opposite sides of said upper means; and a plurality of individual supporting connections respectively between said additional supports and said top parts of the housings, each of said connections including provision for adjustment of the housings transversely relative to said additional supports.

8. A mobile cotton harvester for harvesting cotton simultaneously from plants in two adjacent rows in a cotton field, comprising: a vehicle for travelling over the field along said rows; support means connected to the vehicle for travel therewith and including transversely spaced upright portions providing a pair of elongated throat means disposed respectively lengthwise along and for simultaneously receiving plants in said two adjacent rows, said portions that provide the throat means having transversely alined front end portions and rearwardly spaced and transversely alined rear end portions, and said support means having transversely spaced apart inner sides respectively transversely inwardly of the throat means and defining and being open in a central upright and lengthwise zone over the centerline between said two adjacent rows; first picking means located at one end portion of one throat means between said central zone and one row of said two adjacent rows; second picking means located at the corresponding end portion of the other throat means in transverse alinement with the first picking means and between said central zone and the other row of said two adjacent rows; each of said first and second picking means comprising an upright element providing a vertical axis between said central zone and the respective one of said two adjacent rows, and a plurality of uniformly vertical spaced horizontal layers of picking fingers projecting generally radially as respects said axis, the fingers in each layer being arranged to travel in a horizontal orbit about said axis and projecting inwardly at one side of said orbit across said central zone and projecting outwardly at the other side of said orbit across the respective row of said two adjacent rows; said layers of fingers in the first picking means being vertically staggered relative to the layers of fingers in the second picking means so that the fingers of one means will pass between those of the other means as they overlap across said central zone; and third and fourth picking means disposed in transversely spaced alinement at the other ends of the throat means and respectively between said throat means and the outer sides of the support means, each of said third and fourth picking means including a supporting element providing a vertical axis and a plurality of uniformly vertically spaced, horizontal layers of picking fingers movable respectively in orbits so that the fingers project inwardly across the respective row of said two adjacent rows.

9. The invention defined in claim 8, further characterized in that: the layers of fingers in the third and fourth picking means are vertically staggered respectively on the order of the layers of fingers in the first and second picking means so that the layers of fingers in the first and third picking means are respectively in the same generally horizontal planes, and the layers of fingers in the second and fourth picking means are respectively horizontally coplanar but staggered vertically relative to the horizontal planes of the layers of fingers in said first and third picking means.

10. A mobile cotton harvester for harvesting cotton simultaneously from plants in two adjacent rows in a cotton field, comprising: a vehicle for travelling over the field along said rows; a pair of independent, transversely alined support means connected to the vehicle for travel therewith, each support means including transversely spaced upright portions providing an elongated throat means disposed lengthwise of and for receiving plants in the respective row of said two adjacent rows, said throat means portions having transversely alined front end portions and rearwardly spaced and transversely alined rear end portions; each support means having an open inner side closely proximate to the centerline between said two adjacent rows and an outer side laterally outwardly of the respective throat means; means arranging the support means for transverse adjustment relative to each other to vary the transverse spacing between the throat means; means for fixing the support means in selected positions of transverse adjustment; a pair of picking means carried respectively by the pair of support means, each picking means being of the character comprising a plurality of uniformly vertically spaced layers of picking fingers arranged so that the fingers in each layer travel in an orbit overlapping the aforesaid centerline at the inner side of said orbit and overlapping the respective row at the outer side of said orbit, said fingers projecting inwardly through the inner open side of the respective support means and projecting outwardly into the respective throat means; and said layers of fingers in one picking means being vertically staggered relative to the layers of fingers in the other picking means so that the fingers of one picking means will pass between the fingers of the other picking means as they overlap across said centerline.

11. A mobile cotton harvester for harvesting cotton simultaneously from plants in two adjacent rows in a cotton field, comprising: a vehicle for travelling over the field along said rows; a pair of independent, transversely alined support means connected to the vehicle for travel therewith, each support means including transversely spaced upright portions providing an elongated throat means disposed lengthwise of and for receiving plants in the respective row of said two adjacent rows, said throat means having transversely alined front end portions and rearwardly spaced and transversely alined rear end portions; each support means having an open inner side closely proximate to the centerline between said two adjacent rows and an outer side laterally outwardly of the respective throat means; a pair of picking means carried respectively by the pair of support means, each picking means being of the character comprising a plurality of vertically spaced layers of picking fingers arranged so that the fingers in each layer travel in an orbit overlapping the aforesaid centerline at the inner side of said orbit and overlapping the respective row at the outer side of said orbit, said fingers projecting inwardly through the inner open side of the respective support means and projecting outwardly into the respective throat means; and said layers of fingers in one picking means being vertically staggered relative to the layers of fingers in the other picking means so that the fingers of one picking means will pass between the fingers of the other picking means as they overlap across said centerline.

12. A mobile cotton harvester for harvesting cotton simultaneously from plants in two adjacent rows in a cotton field, comprising: a vehicle for travelling over the field along said rows; a pair of transversely alined independent picking mechanisms spaced apart transversely to pick cotton simultaneously from plants in said two adjacent rows, each picking mechanism including upright inner and outer rotary picker drums offset laterally so as to lie respectively inside and outside the respective row of said two adjacent rows, each inner drum being disposed between its respective row and an upright plane lengthwise of and centrally between the two adjacent rows and said inner drums being closely spaced apart and transversely alined, said outer drums being offset longitudinally from the inner drums and transversely alined with each other; each drum including a plurality of picking fingers projecting generally radially from the drum and arranged in a plurality of uniformly vertically spaced horizontal series and mounted so that the fingers in each series travel in a horizontal orbit, the fingers on the outer drums projecting at times respectively inwardly across the two adjacent rows to pick from the outer sides of plants in said rows, and the fingers on the inner drums projecting at times respectively outwardly across said two adjacent rows to pick from the inner sides of plants in said rows and projecting at times simultaneously inwardly across said central plane, and said plurality of series of fingers in one inner drum being vertically staggered relative to the plurality of series of fingers in the other inner drum so that said fingers of the inner drums loosely interfit across said plane.

13. A multi-row harvester, comprising: supporting structure and means for carrying said structure over a field of crops planted in parallel rows; a pair of harvesting units connected to the supporting structure for travel therewith over such field, said units being arranged in transversely spaced and alined relationship to operate simultaneously on crops in at least two rows; each unit including inner and outer side portions spaced apart to receive therebetween the plants in the respective row on which said unit operates, and each inner side portion being open and having a lower marginal edge running lengthwise as respects the travel of the supporting structure and disposed closely above the ground; said inner side portions of the units lying side by side at opposite sides of the centerline between the rows on which said units operate, and with the lower marginal edges thereof closely spaced apart transversely; means in each unit between the respective inner and outer side portions for handling crops in the respective row, each of said means including movable elements projecting through the respective open side portions toward the open side portions of the other unit and above the level of the aforesaid lower marginal edges; and a pair of guard means carried by said units, one by each marginal edge and projecting crosswise of the space between said marginal edges below the level of the aforesaid elements.

14. A multi-row harvester, comprising: supporting structure and means for carrying said structure over a field of crops planted in parallel rows; a pair of harvesting units connected to the supporting structure for travel therewith over such field, said units being arranged in transversely spaced and alined relationship to operate simultaneously on crops in at least two rows; each unit including inner and outer side portions spaced apart to receive therebetween the plants in the respective row on which said unit operates, and each inner side portion being open and having a lower marginal edge running lengthwise as respects the travel of the supporting structure and disposed closely above the ground; said inner side portions of the units lying side by side at opposite sides of the centerline between the rows on which said units operate, and with the lower marginal edges thereof closely spaced apart transversely; means in each unit between the respective inner and outer side portions for handling crops in the respective row, each of said means including movable elements exposed through the respective open side portions above the level of the aforesaid lower marginal edges; and guard means carried by one of said units at and projecting crosswise of the space between said marginal edges below the level of the aforesaid elements.

15. A two-row cotton picker, comprising: supporting structure and means for carrying said structure over a field of cotton plants planted in parallel rows; a pair of picking units connected to the supporting structure for travel therewith over such field, said units being arranged in transversely spaced and alined relationship to operate simultaneously on cotton plants in two adjacent rows; each unit including inner and outer side portions spaced apart to receive therebetween the plants in the respective row on which said unit operates, and each inner side portion being open and having a lower mariginal edge running lengthwise as respects the travel of the supporting structure and disposed closely above the ground; said inner side portions of the units lying side by side at opposite sides of the centerline between the rows on which said units operate, and with the lower marginal edges thereof closely spaced apart transversely; cotton picking means in each unit between the respective inner and outer side portions for handling cotton in the respective row, each of said means including movable picking fingers exposed through the respective open side portions above the level of the aforesaid lower marginal edges; and guard means carried by one of said units at and projecting crosswise of the space between said marginal edges below the level of the aforesaid picking fingers.

16. A multi-row harvester, comprising: a vehicle for travelling over a field in which crops are planted in parallel rows; a pair of harvesting units arranged in transversely spaced and alined relationship and substantially centered respectively over two adjacent rows to define a central space therebetween midway between such two adjacent rows, each unit including inner and outer side portions spaced apart respectively inside and outside the respective row over which said unit is centered to define a plant passage for receiving the crops in said respective row; each inner side portion being open to expose the interior of the respective unit and having a lower marginal edge disposed closely above the ground; said inner side portions lying in closely spaced apart side-by-side relationship at opposite sides of the centerline between said two adjacent rows, with said marginal edges defining generally the bottom of the space between said inner side portions; means connecting the units to the vehicle for travel therewith and including provision for transverse adjustment of the units relative to each other to vary the transverse spacing between said plant passages and consequently to vary the transverse spacing between said inner side portions; crop-handling means in each unit including vertically spaced apart movable elements projecting through the respective inner side portion toward the inner side portion of the other unit and above the level of said marginal edges, the vertical spacing of the elements in one unit being staggered relative to that of the elements in the other unit so that the elements of one unit will loosely interfit at least when the units are adjusted closely together so as to narrow the space between said inner side portions; and a pair of guard means carried by the units, one at and projecting crosswise of the space between said marginal edges, each guard means including portions cooperative with portions of the other guard means to form a barrier across the bottom of the space between said inner side portions of the units, said guard portions being arranged in staggered relationship to loosely interfit for accommodating adjustment of the units.

17. A multi-row harvester, comprising a vehicle for travelling over a field in which crops are planted in parallel rows; a pair of harvesting units arranged in transversely spaced and alined relationship and substantially centered respectively over two adjacent rows to define a central space therebetween midway between such two adjacent rows; each unit including inner and outer side portions spaced apart respectively inside and outside the respective row over which said unit is centered to define a plant passage for receiving the crops in said respective row; each inner side portion being open to expose the interior of the respective unit; said inner side portions lying in closely spaced apart side-by-side relationship at opposite sides of the centerline between said two adjacent rows; means connecting the units to the vehicle for travel therewith and including provision for transverse adjustment of the units relative to each other to vary the transverse spacing between said plant passages and consequently to vary the transverse spacing between said inner side portions; and crop-handling means in each unit including vertically spaced apart movable elements projecting through the respective inner side portion toward the inner side portion of the other unit, the vertical spacing of the elements in one unit being staggered relative to that of the elements in the other unit so that the elements of one unit will loosely interfit at least when the units are adjusted closely together so as to narrow the central space between said inner side portions.

18. A multi-row harvester, comprising: a vehicle for travelling over a field in which crops are planted in parallel rows; a pair of harvesting units arranged in transversely spaced and alined relationship and substantially centered respectively over two adjacent rows to define a central space therebetween midway between such two adjacent rows; each unit including inner and outer side portions spaced apart respectively inside and outside the respective row over which said unit is centered to define a plant passage for receiving the crops in said respective row; each inner side portion being open to expose the interior of the respective unit and having a lower marginal edge disposed closely above the ground; said inner side portions lying in closely spaced apart side-by-side relationship at opposite sides of the centerline between said two adjacent rows, with said marginal edges defining generally the bottom of the space between said inner side portions; means connecting the units to the vehicle for travel therewith and including provision for transverse adjustment of the units relative to each other to vary the transverse spacing between said plant passages and consequently to vary the transverse spacing between said inner side portions; crop-handling means in each unit exposed through the respective inner side portion toward the inner side portion of the other unit and above the level of said marginal edges; and a pair of guard means carried by the units, one at and projecting crosswise of the space between said marginal edges, each guard means including portions cooperative with portions of the other guard means to form a barrier across the bottom of the central space between said inner side portions of the units, said guard portions being arranged in staggered relationship to loosely interfit for accommodating adjustment of the units.

19. A multi-row harvester, comprising: a vehicle for travelling over a field in which crops are planted in parallel rows; a pair of harvesting units transversely alined in closely spaced apart side-by-side relationship and respectively having plant passages to receive crops in two adjacent rows, each unit having an inner side portion and said side portions being closely spaced apart at opposite sides of the centerline between said two adjacent rows to define a central space between the units; a central support on the vehicle and extending in proximity to said central space; central means connecting the central support to the units, including an element common to the units and bridging said central space, said connecting means including provision for movement of the units relative to each other and relative to the central support; a pair of outer supports spaced apart transversely on the vehicle with the central support between them and extending respectively to outer portions of the units at opposite sides of the central connecting means; a pair of outer connecting means connected respectively to said outer portions of the units and to said outer supports, each of said outer connecting means including provision for transverse movement of its unit relative to its outer support; and means interconnecting the units and including relatively movable members for simultaneously exerting opposite transverse forces on the units to adjust the units transversely relative to each other.

20. The invention defined in claim 19, further characterized in that: the adjusting means comprises a pair of oppositely threaded reaction members secured respectively to the units, one at each side of said central space; and a rotatable force-exerting member bridging said central space and having oppositely threaded opposite ends cooperative respectively with said reaction members.

21. A multi-row harvester, comprising: a vehicle for travelling over a field in which crops are planted in parallel rows; a pair of harvesting units transversely alined in closely spaced apart side-by-side relationship and respectively having plant passages to receive crops in two adjacent rows, each unit having an inner side portion and said side portions being closely spaced apart at opposite sides of the centerline between said two adjacent rows to define a central space between the units; a pair of upper housings secured respectively to the tops of the units and having inner portions respectively proximate to said inner side portions; said inner portions of the housings being transversely oppositely recessed to increase the transverse spacing therebetween and to provide a central pocket between the housings; a central support on the vehicle and extending in proximity to said central space; central means connecting the central support to the units, including an element common to the units and bridging said central space, said connecting means including provision for movement of the units relative to each other and relative to the central support; a pair of outer supports spaced apart transversely on the vehicle with the central support between them and extending respectively to outer portions of the units at opposite sides of the central connecting means; a pair of outer connecting means connected respectively to said outer portions of the units and to said outer supports, each of said outer connecting means including provision for transverse movement of its unit relative to its outer support; and means disposed in said central pocket and interconnecting the units and including relatively movable members for simultaneously exerting opposite transverse forces on the units to adjust the units transversely relative to each other.

22. A multi-row harvester, comprising: a pair of side-by-side harvesting units, each having upright, open inner side portions relatively closely spaced apart and horizontal bottom portions adjoining said side portions to define a central space between the units; harvesting mechanism carried in each unit above the bottom portion and exposed through the inner side portion of the respective unit; and trash guard means bridging the central space between the units and including cooperative elements secured respectively to the units and lying generally in the horizontal plane of said bottom portions.

23. A multi-row harvester, comprising: a pair of side-by-side harvesting units, each having upright, open inner side portions relatively closely spaced apart and horizontal bottom portions adjoining said side portions to define a central space between the units; harvesting mechanism carried in each unit above the bottom portion and exposed through the inner side portion of the respective unit; and trash guard means bridging the central space between the units and including a trash-deflecting element secured to at least one of the units and lying generally in the horizontal plane of said bottom portions.

24. A multi-row harvester, comprising: a pair of side-by-side harvesting units, each having upright, open inner side portions relatively closely spaced apart and horizontal bottom portions adjoining said side portions along spaced apart horizontal edges to define an elongated central space between the units; harvesting mechanism carried in each unit above the bottom portion and exposed through the inner side portion of said unit; and a pair of trash guards secured respectively to the units and bridging said central space generally in the horizontal plane of said bottom portion, each guard including a first horizontal member lengthwise of and secured to one of the aforesaid horizontal edges, a plurality of fingers spaced apart lengthwise of and secured to said member and projecting across the central space, the spacing between the fingers of one guard being staggered lengthwise relative to the spacing of the fingers of the other guard so as to loosely interfit across said central space, and each guard further including a second horizontal member substantially paralleling the first member and joining intermediate portions of the fingers of the respective guard.

25. A multi-row harvester, comprising: a pair of side-by-side harvesting units, each having upright, open inner side portions relatively closely spaced apart and horizontal bottom portions adjoining said side portions to define a central space between the units; harvesting mechanism carried in each unit above the bottom portion; and trash guard means bridging the central space between the units and including a trash-deflecting element secured to at least one of the units and lying generally in the horizontal plane of said bottom portions.

26. A multi-row harvester, comprising: a pair of side-by-side harvesting units, each having upright, open inner side portions relatively closely spaced apart and horizontal bottom portions adjoining said side portions along spaced apart horizontal edges to define an elongated central space between the units; harvesting mechanism carried in each unit above the bottom portion and exposed through the inner side portion of said unit; and a pair of trash guards secured respectively to the units and bridging said central space generally in the horizontal plane of said bottom portion, each guard including a first horizontal member lengthwise of and secured to one of the aforesaid horizontal edges, a plurality of fingers spaced apart lengthwise of and secured to said member and projecting across the central space, and the spacing between the fingers of one guard being staggered lengthwise relative to the spacing of the fingers of the other guard so as to loosely interfit across said central space.

27. A mobile, multi-row harvester comprising: a vehicle for travelling over a field in which crops are planted in parallel rows, said vehicle including a longitudinal frame centered over the centerline between two adjacent rows, and a pair of transversely spaced ground-engaging means spanning said two adjacent rows and running respectively immediately outside said two adjacent rows; said ground-engaging means carrying the frame at a level substantially spaced above the ground to provide for passage of the frame generally over the crops; a pair of harvesting units arranged in side-by-side, transversely alined relationship and respectively having longitudinal passage means for respectively receiving crops in said two adjacent rows, each unit including an upper portion substantially at the level of the frame and a lower portion proximate to the ground, and said units further having outer side portions substantially longitudinally alined respectively with the ground-engaging means and proximate longitudinal upright inner side portions closely related at opposite sides of said centerline between said two adjacent rows to define a longitudinal central space in alinement with the centerline of the vehicle frame; a central suspension arm connected to the vehicle frame and extending above said central space between the units; connecting means secured in common to the units and bridging the top of said central space and connected to said arm; a central link means connected to the frame below and substantially vertically alined with the central arm and extending into proximity to lower parts of said upright inner side portions; second connecting means secured and common to the units and bridging said lower portion of said central space and connected to said link means; a pair of upper outer suspension arms connected to the frame and to the tops of the units, one at each side of the central arm; and a pair of lower outer link means connected to the frame and to lower portions of the units, one at each side of the central link means.

28. A mobile harvester, comprising: a vehicle for travelling over a field of crops planted in parallel rows, said vehicle including a longitudinal frame and a pair of transversely spaced ground-engaging means adapted to span two adjacent rows and to carry the frame between them and substantially centered over the centerline between said two rows; transverse means connected to the frame and extending between the pair of ground-engaging means and at a level generally over the tops of crops in said rows; a pair of transversely alined harvester units in side-by-side relationship to operate respectively on crops in said two rows, said units having longitudinal, upright inner side portions closely spaced apart transversely at opposite sides of said centerline between said two rows to define a longitudinal central space between the units, each unit further having top portions generally at the level of and spaced longitudinally from said trnaverse means and bottom portions proximate to the ground; central arm means mounted on the transverse means and extending longitudinally above said central space and having a connection to inner top portions of the units; a pair of outer longitudinal arm means mounted on the transverse means and individually connected respectively to the tops of the units in transversely spaced relation at opposite sides of the central arm means; a pair of transversely spaced supports depending from the frame generally below the transverse means and respectively longitudinally alined with lower outer portions of the units; a pair of link means respectively interconnecting said supports and said lower portions of the units; a central support depending from the frame generally below the transverse means and longitudinally alined with the central space between the units; and link means connected to said central support and having a common connection to lower portions of the units across said central space.

29. A multi-row harvester for travelling over a field in which crops are planted in parallel rows, comprising: a pair of harvesting means arranged in side-by-side, closely transversely spaced relationship to operate simultaneously on plants in two adjacent rows, each means having a longitudinal throat disposed lengthwise of and for receiving crops in the respective row of said two rows; said pair of harvesting means being transversely alined and including longitudinally movable crop-handling elements movable at times respectively in the crop-receiving throats through transversely spaced and alined crop-handling zones centered respectively on said two adjacent rows, and said elements of both harvesting means simultaneously projecting at times across the centerline between said two adjacent rows to travel longitudinally and simultaneously through a longitudinal central zone between said pair of harvesting means and centered on said centerline; and means arranging said elements for travel in vertically staggered relationship through said central zone to avoid conflict in said central zone between the elements of the two harvesting means.

30. A multi-row harvester, comprising: a vehicle for travelling over a field of crops planted in parallel rows; a pair of harvesting means arranged in side-by-side closely transversely spaced relationship to operate simultaneously on plants in two adjacent rows, each means having a longitudinal throat disposed lengthwise of and for receiving crops in the respective row of said two rows; means connecting the harvesting means to the vehicle for travel with said vehicle, and including provision for adjusting one harvesting means transversely relative to the other to selectively space the harvesting means transversely apart at different distances between a maximum position and a minimum position; said pair of harvesting means being transversely alined and including longitudinally movable crop-handling elements movable at times respectively in the crop-receiving throats through transversely spaced and alined crop-handling zones centered respectively on said two adjacent rows, and said elements of both harvesting means simultaneously projecting at times across the centerline between said two adjacent rows to travel longitudinally and simultaneously through a longitudinal central zone between said pair of harvesting means and centered on said centerline at least when said pair of harvesting means is transversely adjusted in said minimum position; and means arranging said elements in vertically staggered relationship at least in said central zone so that the elements of one harvesting means loosely enter between elements of the other harvesting means when said harvesting means is adjusted transversely from its maximum position toward its minimum position.

31. A multi-row harvester, comprising: a vehicle for travelling over a field in which crops are planted in uniformly spaced rows; a pair of harvesting units connected to the vehicle for travel therewith and arranged in transversely alined, side-by-side relationship to operate simultaneously on two adjacent rows; each unit having a longitudinal plant-receiving passage for receiving plants in its respective row, and each unit being generally in the form of a box-like structure closed at its top and outer side and closed at its front, back and bottom except for said passage, and having its inner side open; said units being positioned with their open inner sides closely proximate at opposite sides of the centerline between said two adjacent rows to define a longitudinal central space between the units; means across the fronts of the units and overlying the front of the space to provide a front closure for said space; means across the backs of the units and overlying the rear of the space to provide a back closure for said space; harvesting mechanism in each unit; pneumatic conveying means associated with the units for conveying crops from the harvesting mechanisms to a point exteriorly of the units, including a pair of conduits communicating respectively with the interiors of the units; and grid means carried by at least one of the units and extending across the bottom of said central space between the units to prevent the entrance of ground-borne trash to the interiors of the units.

32. A multi-row harvester, comprising: a vehicle for travelling over a field in which crops are planted in uniformly spaced rows; a pair of harvesting units connected to the vehicle for travel therewith and arranged in transversely alined, side-by-side relationship to operate simultaneously on two adjacent rows; each unit having a longitudinal plant-receiving passage for receiving plants in its respective row, and each unit being generally in the form of a box-like structure closed at its top and outer side and closed at its front, back and bottom except for said passage, and having its inner side open; said units being positioned with their open inner sides closely proximate at opposite sides of the centerline between said two adjacent rows to define a longitudinal central space between the units; means across the fronts of the units and overlying the front of the space to provide a front closure for said space; harvesting mechanism in each unit; pneumatic conveying means associated with the units for conveying crops from the harvesting mechanisms to a point exteriorly of the units, including a pair of conduits communicating respectively with the interiors of the units; and grid means carried by at least one of the units and extending across the bottom of said central space between the units to prevent the entrance of ground-borne trash to the interiors of the units.

33. A multi-row harvester, comprising: a vehicle for travelling over a field in which crops are planted in uniformly spaced rows; a pair of harvesting units connected to the vehicle for travel therewith and arranged in transversely alined, side-by-side relationship to operate simultaneously on two adjacent rows; each unit having a longitudinal plant-receiving passage for receiving plants in its respective row, and each unit being generally in the form of a box-like structure closed at its top and outer side and closed at its front, back and bottom except for said passage, and having its inner side open; said units being positioned with their open inner sides closely proximate at opposite sides of the centerline between said two adjacent rows to define a longitudinal central space between the units; harvesting mechanism in each unit; pneumatic conveying means associated with the units for conveying crops from the harvesting mechanisms to a point exteriorly of the units, including a pair of conduits communicating respectively with the interiors of the units; and grid means carried by at least one of the units and extending across the bottom of said central space between the units to prevent the entrance of ground-borne trash to the interiors of the units.

34. A multi-row harvester, comprising: a vehicle for travelling over a field in which crops are planted in uniformly spaced rows; a pair of harvesting units arranged in transversely alined, side-by-side relationship to operate simultaneously on two adjacent rows; each unit having a longitudinal plant-receiving passage for receiving plants in its respective row, and each unit being generally in the form of a box-like structure closed at its top and outer side and closed at its front, back and bottom except for said passage, and having its inner side open; said units being positioned with their open inner sides closely proximate at opposite sides of the centerline between said two adjacent rows to define a longitudinal central space between the units; means connecting the units to the vehicle for travel therewith and including provision for transverse adjustment of the units relative to each other; means across the fronts of the units and overlying the front of the space to provide a front closure for said space, said front means including relatively extensible elements for accommodating transverse adjustment of the units; harvesting mechanism in each unit; pneumatic conveying means associated with the units for conveying crops from the harvesting mechanisms to a point exteriorly of the units, including a pair of conduits communicating respectively with the interiors of the units; and grid means carried by the lower portion of at least one of the units in proximity to the ground and bridging said central space between the units to prevent the entrance of ground-borne trash to the interiors of the units, said grid means being arranged to accommodate relative transverse adjustment of the units.

EDWARD C. BOPF.
FRED A. THOMANN.

References Cited in the file of this patent

UNITED STATES PATENTS

| Number | Name | Date |
|---|---|---|
| 2,073,653 | Rust et al. | Mar. 16, 1937 |
| 2,140,631 | Johnston | Dec. 20, 1938 |